United States Patent [19]
Bellamy et al.

[11] Patent Number: 5,549,283
[45] Date of Patent: Aug. 27, 1996

[54] HYDRAULIC ANTIVIBRATION SUPPORTS

[75] Inventors: Alain Bellamy, Naveil; Denis Reh; Pascal Petit, both of Chateaudun, all of France

[73] Assignee: Hutchinson, Paris, France

[21] Appl. No.: 548,857

[22] Filed: Oct. 26, 1995

[30]         Foreign Application Priority Data

Oct. 27, 1994 [FR] France ................................. 94 12889

[51] Int. Cl.$^6$ ........................................................ F16F 9/00
[52] U.S. Cl. ................................ 267/140.12; 267/141.3; 267/293
[58] Field of Search ............................ 267/140.12, 141.1, 267/141.2, 141.3, 141.4, 141.5, 141.7, 293, 219, 35; 248/562, 636

[56]                 References Cited

U.S. PATENT DOCUMENTS

| 4,262,886 | 4/1981 | Le Salver et al. . | |
| 4,767,106 | 8/1988 | Le Fol . | |
| 4,872,650 | 10/1989 | Tabata et al. | 267/140.12 |
| 5,048,803 | 9/1991 | Brenner | 267/140.12 |
| 5,178,373 | 1/1993 | Takeguchi et al. | 267/140.12 |

FOREIGN PATENT DOCUMENTS

| 0012638 | 11/1979 | European Pat. Off. . | |
| 0172700 | 8/1985 | European Pat. Off. . | |
| 0236199 | 2/1987 | European Pat. Off. . | |
| 0556076 | 1/1993 | European Pat. Off. . | |
| 0646735 | 8/1994 | European Pat. Off. . | |
| 2622269 | 10/1988 | France . | |
| 3935499 | 5/1991 | Germany . | |
| 1229130 | 9/1989 | Japan | 267/140.12 |
| 2200190 | 12/1987 | United Kingdom . | |
| 2207214 | 6/1988 | United Kingdom . | |
| 2211580 | 7/1989 | United Kingdom . | |

OTHER PUBLICATIONS

Patent abstract of Japan, vol. 8 No. 140 (M–305) (1577), Jun. 29, 1984.

Primary Examiner—Robert J. Oberleitner
Assistant Examiner—Peter M. Poon
Attorney, Agent, or Firm—Larson and Taylor

[57]                 ABSTRACT

A hydraulic antivibration support comprises first and second rigid strength members, an elastomer body having a thick wall interconnecting the two rigid strength members and defining a hydraulic working chamber, and a thin wall defining a hydraulic compensation chamber which is connected to the working chamber via a narrow channel. The elastomer body is extended by a flexible elastomer tongue which is received in a slot-shaped housing of the second strength member, said housing including a face in communication with the working chamber and a face in communication with the compensation chamber, both faces being closable in alternation by the flexible tongue.

7 Claims, 2 Drawing Sheets

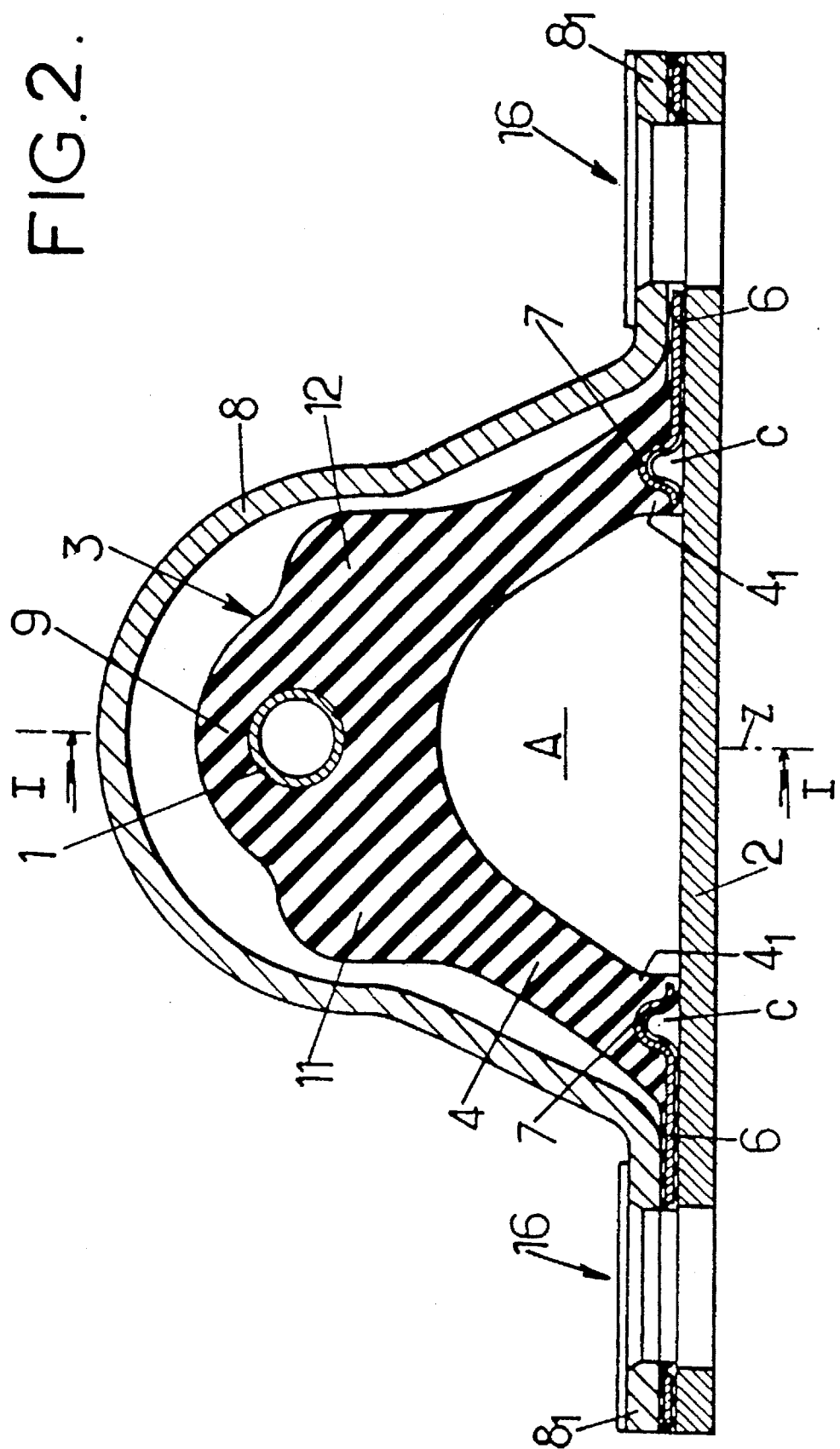

HYDRAULIC ANTIVIBRATION SUPPORTS

The invention relates to antivibration supports designed to be interposed for damping and connection purposes between two rigid elements such as the chassis and the engine of a vehicle, in order to damp vibratory motion between the two rigid elements, essentially along a main vibration direction.

BACKGROUND OF THE INVENTION

More particularly, the invention relates to an antivibration support of this type, comprising first and second rigid strength members suitable for securing to respective ones of the two rigid elements to be united, and an elastomer body having a thick wall interconnecting the two rigid strength members and partially defining a working chamber, said thick wall being substantially bell-shaped, extending along the main vibration direction between a peripheral base secured to the second strength member and a crown secured to the first strength member, said elastomer base further including a freely-deformable thin wall which is integrally formed with the above-mentioned thick wall and which partially defines a compensation chamber that is in communication with the working chamber via a narrow channel, the two chambers and the narrow channel being filled with a liquid, the second strength member being a base plate which extends in a plane that is substantially perpendicular to the main vibration direction and which has a "support" face secured in sealed manner with the elastomer body to cooperate therewith in defining the two chambers and the narrow channel.

Such a device is described in document EP-A-0 236 199, for example.

However, the device described in that document does not include a decoupling flap valve between the two rigid strength members for filtering small amplitude vibrations of relatively high frequency.

OBJECTS AND SUMMARY OF THE INVENTION

A particular object of the present invention is to provide a hydraulic antivibration support of the kind in question which has a decoupling flap valve, but which nevertheless is simple and relatively cheap.

To this end, according to the invention, the base of the elastomer body is integrally formed with a flexible elastomer tongue which extends from said base parallel to the main vibration direction towards the base plate, said base plate including a slot-shaped housing which receives the tongue, the housing being of a width that is slightly greater than the thickness of the tongue and including first and second inside faces disposed parallel to the tongue and facing it, the first inside face having at least one orifice which communicates with the working chamber and the second inside face including at least one orifice which communicates with the compensation chamber, and the tongue being adapted to close one or other of the orifices as a function of liquid displacements between the working chamber and the compensation chamber, the tongue and the housing thus forming a decoupling flap valve.

In preferred embodiments of the invention, use is made of one or more of the following dispositions:

the base plate includes a projecting portion which extends towards the first strength member parallel to the main vibration direction, the slot-shaped housing being formed in said projection portion, and said projection portion forming a partition between the working chamber and the compensation chamber;

the base plate is a part made by casting or molding;

the base plate is made of aluminum;

the base plate is made of a plastics material;

the narrow channel is constituted by a groove formed in the support face of the base plate; and the thin wall of the elastomer body is bell-shaped, the working chamber and the compensation chamber being juxtaposed in non-concentric manner on the support face of the base plate.

BRIEF DESCRIPTION OF THE DRAWINGS

Other characteristics and advantages of the invention appear from the following detailed description of an embodiment thereof, given by way of non-limiting example, and with reference to the accompanying drawings.

In the drawings:

FIG. 2 is a section view on line II—II of FIG. 1;

Figure 1:
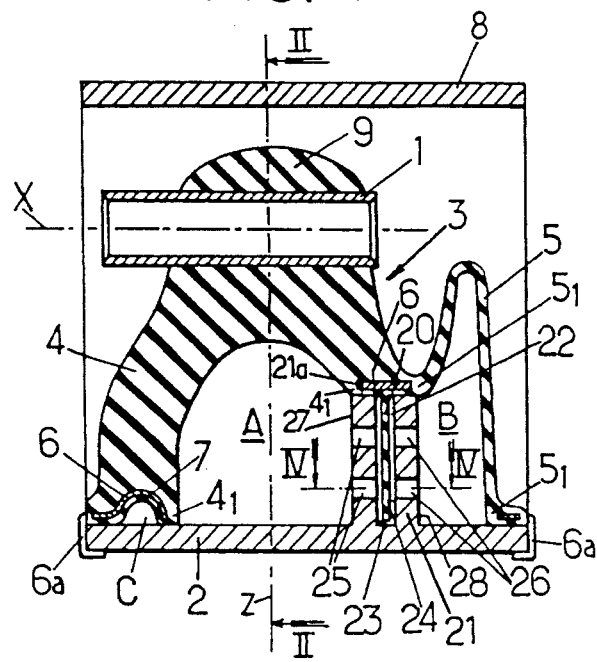
FIG. 1 is a section view through an embodiment of the invention, the section being on line I—I of FIG. 2.
Figure 4:
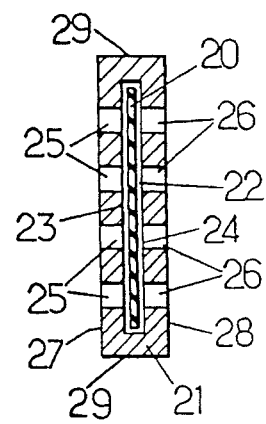
FIG. 4 is a detail view in section of the device of FIG. 1, the section being on line IV–IV of FIG. 1.
Figure 3:
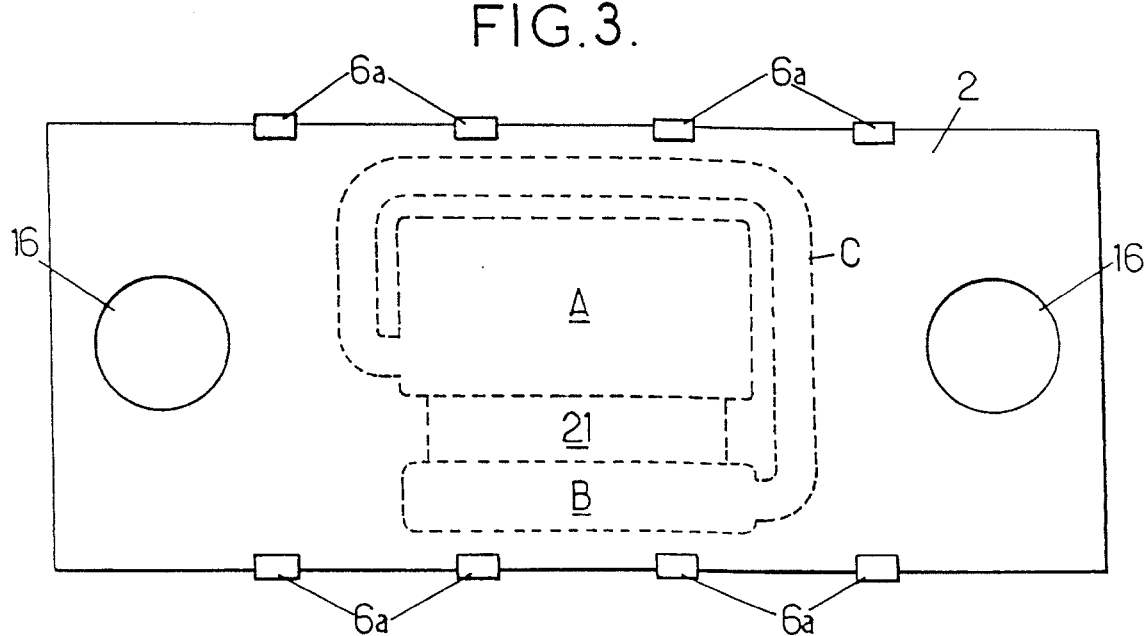
FIG. 3 is a plan view of the device of FIGS. 1 and 2.

In the various figures, the same references designate elements that are identical or similar.

MORE DETAILED DESCRIPTION

The antivibration support shown in the drawings comprises two rigid metal strength members 1 and 2 which are interconnected by an elastomer body 3.

The first strength member 1 is tubular in the example shown, having a longitudinal axis X. More generally, the first strength member 1 may be in the form of an elongate body that is solid or hollow, and of section that is circular or otherwise.

The second strength member 2 is a plate referred to below as a base plate, which is generally plane in shape, at least in part, and which extends parallel to the axis X of the first strength member.

The elastomer body 3 is secured to the first strength member 1 by vulcanization. It has a thick wall 4 that is substantially bell-shaped, extending in a direction Z (in which vibratory motion between the two strength members is to be damped) from a crown secured to the first strength member 1 to a peripheral base $4_1$ secured to the base plate 2. The direction Z is perpendicular to the axis X and to the general plane of the base plate 2, and it may be vertical, for example.

The thick wall 4 has sufficient compression strength to support a load applied to the first strength member 1 parallel to the axis Z and directed towards the base plate. This load may be greater than 15 kg, for example, and is generally much greater than 15 kg.

The peripheral base $4_1$ of the thick wall is secured in sealed manner to the base plate 2, thereby defining a working chamber A. In the example shown, the chamber A is of rectangular horizontal section, but it could be of some other shape, in particular its horizontal section could be circular or oval.

In addition, the elastomer body 3 includes a thin wall 5 that is flexible and that juxtaposes the thick wall 4, being integrally formed therewith.

The thin wall 5 is bell-shaped, having a peripheral base $5_1$ which is secured in sealed manner to the base plate 2, thereby defining a compensation chamber B. The chamber B is rectangular in horizontal section in the example shown, but it could have some other shape.

The walls 4 and 5 preferably do not share a common portion between the chambers A and B, apart from a connection between their bases $4_1$ and $5_1$.

The two chambers A and B communicate via a narrow channel C in the form of a groove made in the face of the elastomer body 3 that is pressed against the base plate 2, the edges of the groove being in sealed contact with the base plate 2.

In addition, in the example shown, the elastomer body 3 is molded over a perforated metal plate 6 disposed on the face of the elastomer body which is in contact with the base plate 2. Thus, the base plate 2 may be secured to the elastomer body by crimping tabs 6a of the perforated plate 6 onto the base plate 2, or possibly by crimping said base plate 2 onto said perforated plate 6.

In addition, the perforated plate 6 has a groove or gutter 7 which accurately defines the shape of the narrow channel C.

The antivibration support also includes a metal arch 8 which is rigidly secured to the base plate 2. The arch 8 surrounds the first strength member 1 and the elastomer body 3, and it extends parallel to the axis X.

In the example shown, the arch 8 is a folded plate covering all of the elastomer body, thereby protecting it from shocks from foreign bodies. This is advantageous insofar as the thin wall 5 is fragile and is exposed to one side of the thick wall 4.

The arch 8 has two lateral extensions $8_1$ on respective sides of the elastomer body 3. These lateral extensions cover respective portions of the perorated plate 8, which itself covers the second strength member. In addition, in each of the extensions $8_1$, these three elements are pierced by a respective hole 16.

The holes 16 enable the antivibration support to be fastened to a rigid part by means of screws or bolts (not shown), and also contribute to holding together the various portions of the antivibration support by clamping the extensions $8_1$ onto the plate 6 and the second strength member 2.

To co-operate with the arch 8, the elastomer body 3 has a first boss 9 extending parallel to the direction Z starting from the first strength member 1 and going away from the base plate 2. The boss 9 is adapted to come into abutment against the top portion of the arch 8, thereby limiting the displacement of the first strength member away from the base plate 2.

The elastomer body also has lateral bosses 11 and 12 that are substantially diametrically opposite about the first strength member 1 and that are adapted to come into abutment against the arch 8 when the first strength member is displaced substantially perpendicularly to the axis A and to the direction Z.

The chambers A and B and the narrow channel C are filled with liquid. When the two strength members 1 and 2 are subjected to relative vibratory motion, the thick wall 4 of the elastomer body deforms, thereby varying the volume of the working chamber A. These variations in volume cause liquid to be transferred between the chambers A and B via the narrow channel C, with variations in the volume of the working chamber A being compensated by complementary variations in the compensation chamber B, whose thin wall 5 is easily deformable.

In the vicinity of a particular frequency, which is generally lower than 20 Hz, and which depends essentially on the dimensions of the narrow channel C and on the density of the liquid in motion in the narrow channel, a resonance phenomenon occurs in the narrow channel C in association with the headlosses in said narrow channel, thereby giving rise to a high degree of damping of vibration between the two strength members 1 and 2.

The antivibration support also includes a decoupling flap valve for filtering vibrations that are of small amplitude, e.g. less than 0.5 mm, and that are of relatively high frequency, e.g. greater than 20 Hz.

This decoupling flap valve is constituted by a flexible tongue 20 integrally formed with the base $4_1$ of the elastomer body 3, the tongue 20 being received in a housing 22 in a projecting portion 21 of the base plate 2.

The projecting portion 21 extends parallel to the main vibration direction Z from the base plate 2 towards the first strength member 1, and it is secured to the base $4_1$ of the thick wall 4 in sealed manner.

The projecting portion 21 is preferably integrally formed with the base plate, which base plate may then advantageously be made of cast aluminum, or possibly out of molded plastics material.

The housing 22 extends parallel to the main vibration direction Z and it is open at the end 21a of the projecting portion 21 which is closer to the first strength member 1. This end 21a is covered by the portion of the base $4_1$ which includes the tongue 20, said end 21a and said portion of the base $4_1$ being bonded together so as to be in sealed contact with each other.

The housing 22 is in the form of a slot having two main inside faces 23 and 24 disposed parallel to the tongue 20 and in the vicinity thereof, i.e. leaving clearance for the tongue 20 inside the housing 22 that may be, for example, of the order of 0.5 mm perpendicular to the plane of the tongue 20.

The projecting portion 21 has two main side faces 27 and 28 which are parallel to the tongue 20 and which are in contact respectively with the working chamber A and with the compensation chamber B, and two narrow end faces 29 which are in sealed contact with the base $4_1$ of the thick wall of the elastomer body and are secured to said base $4_1$.

The side faces 27 and 28 are pierced by orifices respectively referenced 25 and 26, putting the inside face 23 of the housing 22 into communication with the working chamber A and the inside face 24 of the housing 22 into communication with the compensation chamber B.

When the first strength member 1 or the base plate 2 is subjected to vibration of small amplitude and of relatively high frequency, the tongue 20 is itself caused to vibrate, and this phenomenon suffices to achieve a filtering effect preventing the vibration being transferred from one strength member to the other.

When the amplitude of the vibration imposed on one of the strength members is great enough to cause the tongue 20 to come into abutment against one or other of the inside faces 23 and 24 of the housing 22, then the tongue 20 closes the orifices 25 or 26 so that the liquid is forced to flow along the narrow channel C between the working chamber C and the compensation chamber B.

It will be observed that the narrow channel may optionally be made by forming a groove in the base plate 2 during casting or molding, thereby replacing the above-described groove which is formed in the elastomer body.

We claim:

1. A hydraulic antivibration support for interposing between two rigid elements to damp vibration between the two elements, essentially in a main vibration direction, the support comprising first and second rigid strength members suitable for securing to respective ones of the two rigid elements to be united, and an elastomer body having a thick wall interconnecting the two rigid strength members and partially defining a working chamber, said thick wall being substantially bell-shaped, extending along the main vibration direction between a peripheral base secured to the second strength member and a crown secured to the first strength member, said elastomer base further including a freely-deformable thin wall which is integrally formed with the above-mentioned thick wall and which partially defines a compensation chamber that is in communication with the working chamber via a narrow channel, the two chambers and the narrow channel being filled with a liquid, the second strength member being a base plate which extends in a plane that is substantially perpendicular to the main vibration direction and which has a support face secured in sealed manner with the elastomer body to co-operate therewith in defining the two chambers and the narrow channel, wherein the base of the elastomer body is integrally formed with a flexible elastomer tongue which extends from said base parallel to the main vibration direction towards the base plate, said base plate including a slot-shaped housing which receives the tongue, the housing being of a width that is slightly greater than the thickness of the tongue and including first and second inside faces disposed parallel to the tongue and facing it, the first inside face having at least one orifice which communicates with the working chamber and the second inside face including at least one orifice which communicates with the compensation chamber, and the tongue being adapted to close one or other of the orifices as a function of liquid displacements between the working chamber and the compensation chamber, the tongue and the housing thus forming a decoupling flap valve.

2. A hydraulic antivibration support according to claim 1, in which the base plate includes a projecting portion which extends towards the first strength member parallel to the main vibration direction, the slot-shaped housing being formed in said projection portion, and said projection portion forming a partition between the working chamber and the compensation chamber.

3. A hydraulic antivibration support according to claim 1, in which the base plate is a part made by casting or molding.

4. A hydraulic antivibration support according to claim 3, in which the base plate is made of aluminum.

5. A hydraulic antivibration support according to claim 3, in which the base plate is made of a plastics material.

6. A hydraulic antivibration support according to claim 3, in which the narrow channel is constituted by a groove formed in the support face of the base plate.

7. A hydraulic antivibration support according to claim 1, in which the thin wall of the elastomer body is bell-shaped, the working chamber and the compensation chamber being juxtaposed in non-concentric manner on the support face of the base plate.

* * * * *